United States Patent
Almeida et al.

(10) Patent No.: US 7,146,497 B2
(45) Date of Patent: Dec. 5, 2006

(54) SCALABILITY MANAGEMENT MODULE FOR DYNAMIC NODE CONFIGURATION

(75) Inventors: Jason R. Almeida, Raleigh, NC (US); Scott N. Dunham, Raleigh, NC (US); Eric R. Kern, Durham, NC (US); William B. Schwartz, Apex, NC (US); Adam L. Soderlund, Bahama, NC (US); Edward Zorek, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 10/675,623

(22) Filed: Sep. 30, 2003

(65) Prior Publication Data
US 2005/0071625 A1    Mar. 31, 2005

(51) Int. Cl.
*G06F 1/24* (2006.01)
(52) U.S. Cl. ............... 713/100; 713/1; 713/2; 713/100; 710/302; 711/114; 714/2
(58) Field of Classification Search ............ 713/1, 713/2, 100; 710/302; 711/114; 714/2
See application file for complete search history.

(56) References Cited

U.S. PATENT DOCUMENTS

| | | | |
|---|---|---|---|
| 5,689,678 A * | 11/1997 | Stallmo et al. | 711/114 |
| 5,938,765 A * | 8/1999 | Dove et al. | 713/1 |
| 6,347,372 B1 * | 2/2002 | Takashima et al. | 713/2 |
| 6,681,282 B1 * | 1/2004 | Golden et al. | 710/302 |
| 6,842,857 B1 * | 1/2005 | Lee et al. | 713/2 |
| 2003/0163753 A1 * | 8/2003 | Lu et al. | 714/2 |

* cited by examiner

*Primary Examiner*—Thomas Lee
*Assistant Examiner*—Sean Weinman
(74) *Attorney, Agent, or Firm*—Cynthia S. Byrd; Dillon & Yudell LLP

(57) ABSTRACT

A method, system, and program product supporting dynamic configuring of a multi-node computer. The system includes a scalability management module directly coupled to each node in the multi-node computer. The scalability management module sets and maintains configuration parameters for the multi-node computer, wherein if one of the nodes is removed from the multi-node computer, a hot-spare node can be dynamically configured to replace the removed node without having to reconfiguring or physically reconnect the remaining nodes

16 Claims, 3 Drawing Sheets

SCALABILITY MANAGEMENT MODULE FOR DYNAMIC NODE CONFIGURATION

BACKGROUND OF THE INVENTION

1. Technical Field

The present invention relates in general to digital computers, and in particular to multi-node computer systems. Still more particularly, the present invention relates to a method and system for booting up and configuring multi-node computer systems using a scalability management module.

2. Description of the Related Art

Digital computers, and particularly servers, are often multi-node computers, which are logical partitions such as depicted in FIG. 1 and identified as multi-node computer 100. Exemplary multi-node computer 100 has four nodes 102. Each node 102 includes two sets of processors 106, labeled "0" to "7," that typically are sets of four or more processors functioning together as a single coordinated processing unit. Each processor 106 is connected to other processors 106 in other nodes 108 by hardware scalability cables 114, and to other processors 106 within the same node 108 via a service processor 112.

In FIG. 1, boot node 108 is a node 102 that has assumed the role of the boot node for multi-node computer 100. As such, boot node 108 configures the logical partition of nodes defining multi-node computer 100. That is, using a menu in a setup utility in Basic Input/Output System (BIOS) 110, boot node 108 gathers and stores in non-volatile random access memory (NVRAM) 116 the Internet Protocol (IP) information that is specific for each service processor 112 in each node 102. Boot node 108 then communicates with the IP address of each service processor 112 in multi-node computer 100 to complete the configuration (memory allocation, processor allocation, etc.) of multi-node computer 100.

RXE (Remote expansion Enclosure) 118 is a "dumb" Input/Output (I/O) expansion unit which contains additional Peripheral Component Interconnect (PCI) slots. While a separate RXE 118 may be coupled to each node 102/108, typically each partition (multi-node computer 100) shares one or more (typically two) RYE's 118 for optimum resources utilization.

If configuration of multi-node computer 100 is desired to be handled remotely, then a system administrator communicates with boot node 108 via a logic identified as remote manager 120, which is typically a computer.

The architecture illustrated in FIG. 1 is highly rigid. If a scalability cable 114 should fail, then the serial connection/communication among nodes 102 and boot node 108 is lost. If a node 102 or boot node 108 should fail or be pulled out of multi-node computer 100 for maintenance resource re-allocation, then the scalability cables 114 must physically be disconnected from the failed node and reconnected to a replacement node, and a Setup menu in BIOS 110 re-entered to include the replacement node's IP address in the partitioning menus. The new partition information is then rebroadcast to all of the existing nodes in the multi-node computer 100. Further, each node 102, and especially boot node 108, must maintain a large amount of code to handle the partition configuration of multi-node computer 100. Finally, to remotely configure multi-node computer 100, the remote manager 120 must be directly connected to the boot node 108, which means that either 1) only one particular node can ever be the boot node, or 2) every node must be connected to the remote manager 120.

Thus there is a need for a system for an external scalability management module that will ease user installation and configuration while providing independent nodes that ability to join into a processor partition without the joining node being "aware" of the node/cable topology in the partition.

SUMMARY OF THE INVENTION

In view of the foregoing, the present invention provides a method, system, and program product supporting dynamic configuring of a multi-node computer. The system includes a scalability management module directly coupled to each node in the multi-node computer. The scalability management module sets and maintains configuration parameters for the multi-node computer, wherein if one of the nodes is removed from the multi-node computer, a hot-spare node can be dynamically configured to replace the removed node without having to reconfiguring or physically reconnect the remaining nodes.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF A PREFERRED EMBODIMENT

Figure 1:
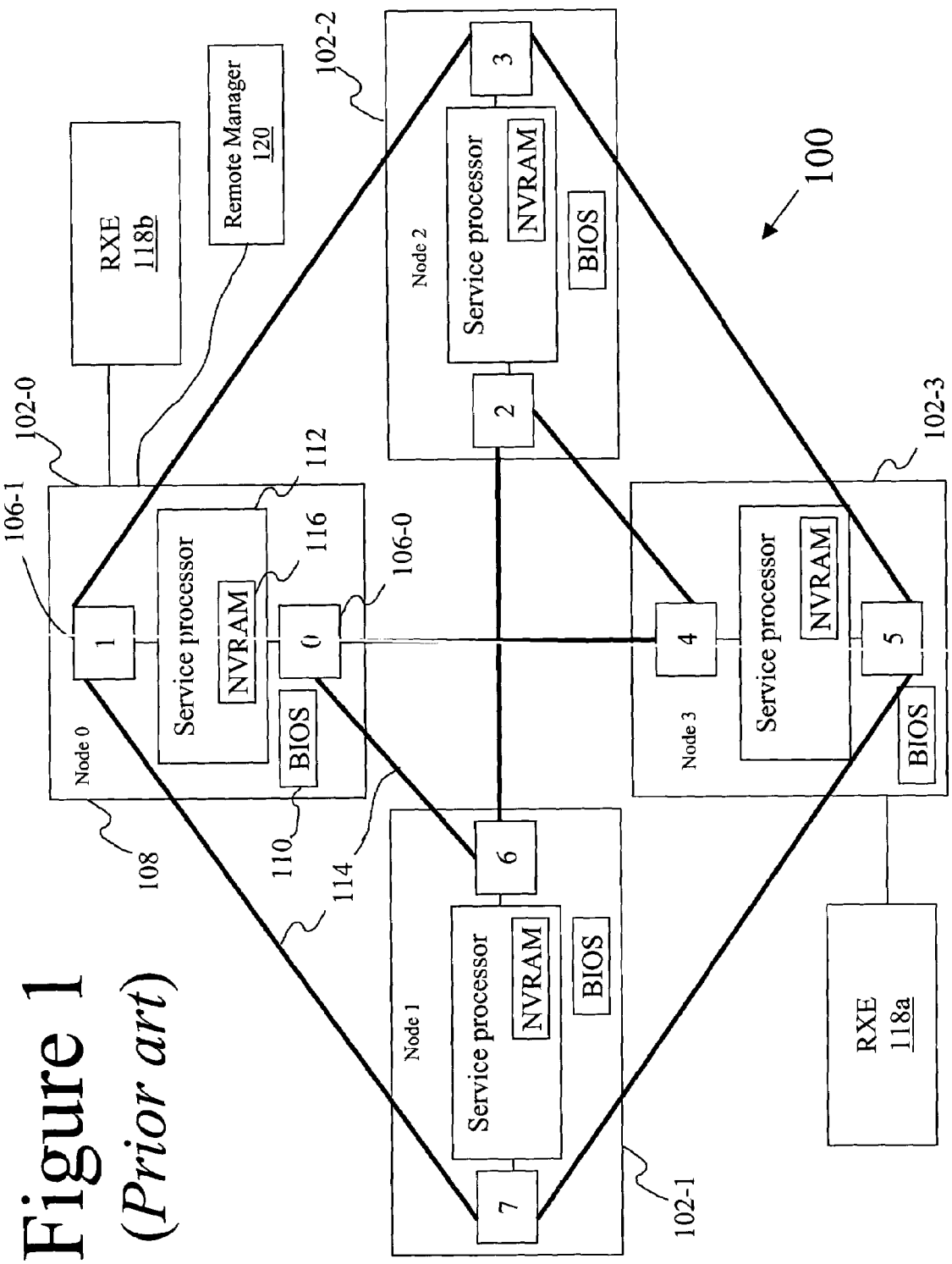
FIG. 1 depicts a typical prior art multi-node computer.
Figure 2:
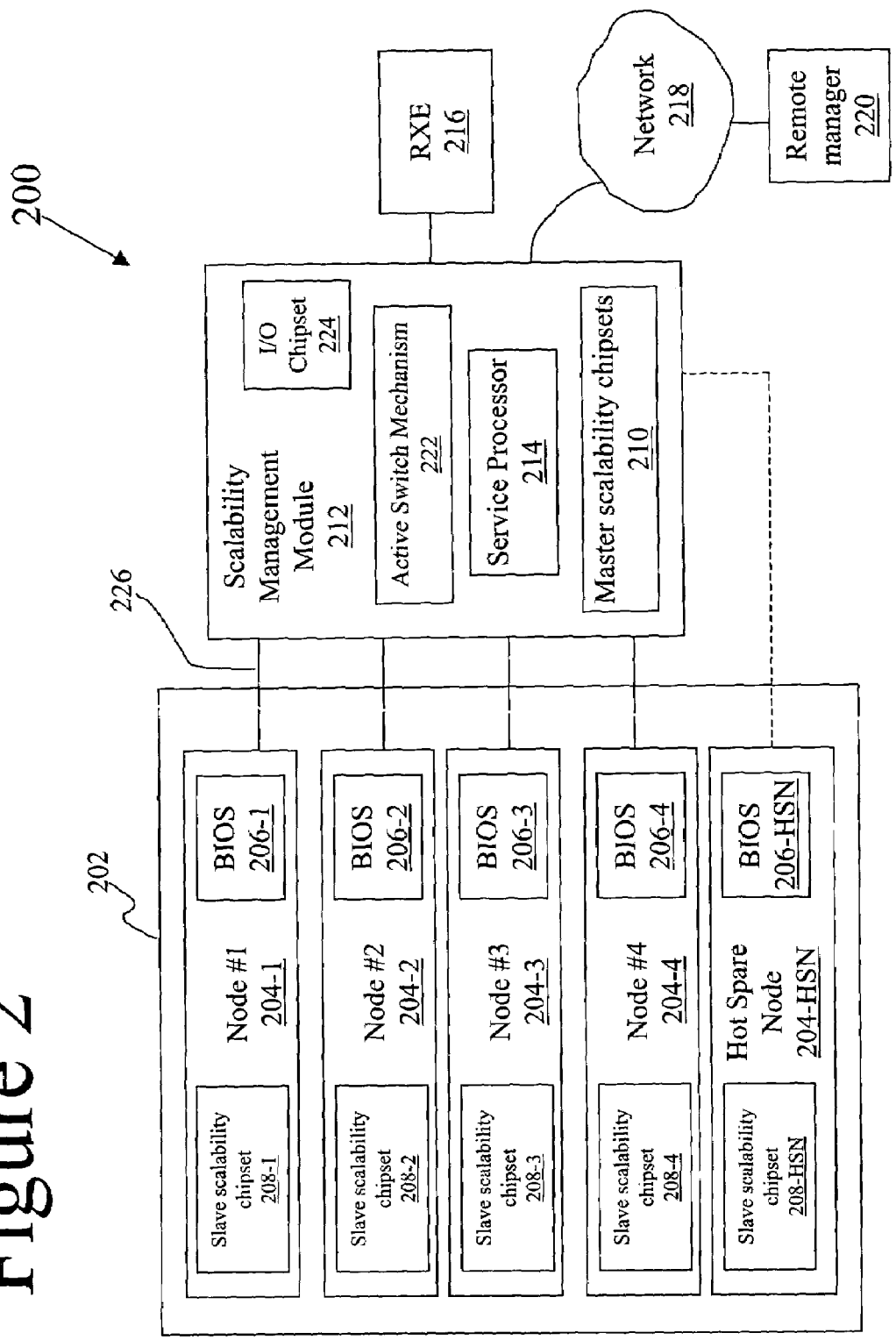
FIG. 2 illustrates an exemplary multi-node computer according to architecture taught by the present invention.

With reference now to FIG. 2, there is depicted in a block diagram a preferred embodiment of the present invention. A system 200 includes a multi-node computer illustrated and identified as a partition 202, which includes multiple nodes 204. Nodes 204-1 through 204-HSN may each be selectively configured as a host, secondary, standalone or hot spare node (as discussed in detail below), Each node 204 includes an on-board BIOS 206 and a slave scalability chipset 208. The BIOS 206 includes a bootstrap program for initializing rudimentary functions of the node 204. The slave scalability chipset 208 includes local memory controllers, processor allocation and set-up hardware/software, and host bridge controller information that is loaded from a master scalability chipset 210 located in a scalability management module (SMM) 212.

SMM 212 directly connects to each node 204, preferably via two Remote expansion Enclosure (RXE) cables 226 to each node 204, via a dedicated master scalability chipset 210. Preferably, a single master scalability chipset 210 may configure all slave scalability chipsets 208 in all nodes 204. SMM 212 is under the local control of a service processor 214, which configures and manages partition 202. SMM 212 may have local autonomous control for managing partition 202, or may be under the remote control of a Remote Manager 220, which is a remote manager logic, remotely operated by a systems manager/administrator, that is connected to SMM 212 via a network 218, such as a local area network (LAN), wide area network (WAN), or the Internet. Alternatively, Remote Manager 220 can be directly connected to SMM 212, preferably by a serial connection.

Also connected to SMM 212 is a Remote expansion Enclosure (RXE) 216, which is a box of external "dumb" PCI slots allowing additional I/O capability to SMM 212. In a preferred embodiment, up to four RXEs 216 are coupled to SMM 212. Communication between RXE 216 or network 218 and service processor 214 or master scalability chipset 210 is selectively controlled by an internal active switch mechanism 222 in SMM 212. Switch mechanism 222 is also configured to control connection selections in master scalability chipset 210. These connection selections configure connections, via switch mechanism 222, between master scalability chipsets 210 and slave scalability chipsets 208 during initial configuration, as well as communication among slave scalability chipsets 208 after configuration, when the master scalability chipsets 210 are preferably disconnected from the enabled partition 202. Switch mechanism 222 also controls an input/output (I/O) chipset 224, which connects RXE 212 to an I/O in each node 204 in partition 202.

Figure 3:
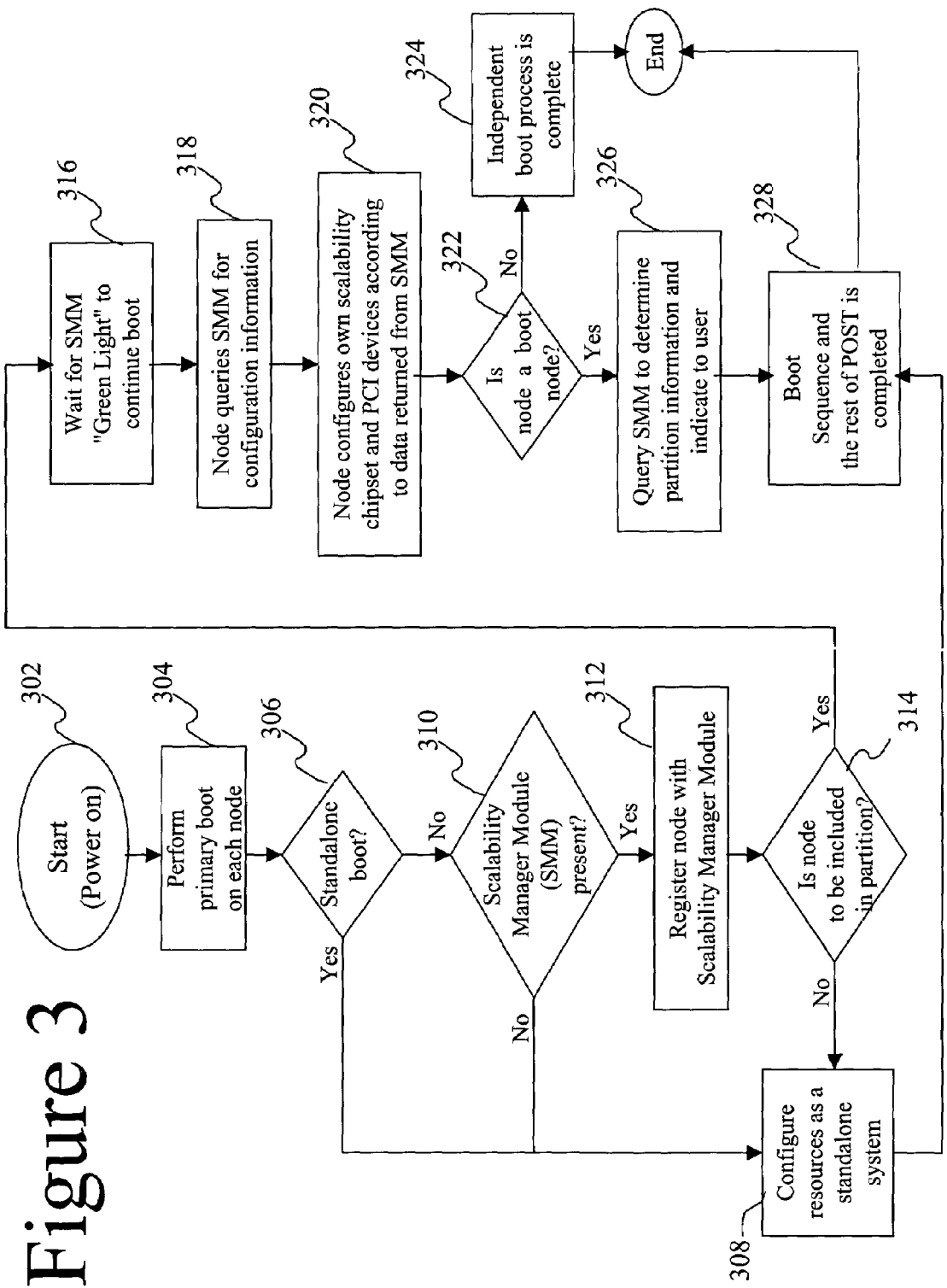
FIG. 3 is a flow chart of a new and novel method for configuring the inventive multi-node computer.

With reference now to FIG. 3, there is a flow-chart of exemplary preferred steps taken in the present invention. Starting at initiator block 302, each node initially powers on, either autonomously or under the control of a remote power controller. Each node performs a primary boot (block 304), including a first part of a Power On Self-Test (POST), memory configuration, configuration of PCI devices/chipset, and other determination of system resources for that node. Each node then determines (query block 306) if that node is to be configured as a standalone node (not a component of a larger partition). If so, then it is so configured (block 308). Otherwise, a query is made as to whether an SMM is available to the node that is booting up (query block 310). If an SMM is not available, then the node completes a default boot as a standalone system.

If an SMM is available to the booting node, then the booting node registers its unique configuration information (e.g., the node's number and type of processors, amount of local memory, Input/Output (I/O) devices, backboard, etc.) with the SMM (block 312). The SMM knows the expected partitioning from information available to the SMM service processor. The SMM also reads a list of Universal Unique Identifiers (UUIDs) for each node in the partition to be formed, and compares this list with the UUIDs available to the SMM. The SMM asks for the amount of system memory that the nodes contain, as well as the nodes' I/O topology. These steps are repeated for all nodes in the partition, including the SMM selectively switching its master scalability chipset to be connected to each slave scalability chipset in turn.

A query (query block 314) is then made by node as to whether that node is to be included in a partition. If not, then that node is configured as a stand-alone processor node. Otherwise, the booting node waits for a "green light" from the SMM indicating that the SMM has determined the configuration information for the booting node (block 316). This configuration information includes calculated reconfiguration addresses for external communication, system memory ranges for each node, which nodes need to be connected to an RXE box to have additional I/O and/or connection to other systems, etc. If an RXE is determined to be required, then connections for the RXE box are dynamically switched to allow communication with a specified node(s).

After receiving the "green light" from the SMM, the booting node then queries the SMM of configuration information (block 318). That is, the booting node then asks the SMM what type of node the booting node will become (host, secondary, hot spare), and how the booting node should be configured (memory mapping, resource naming/identification, IP address for the service process in the node, etc.). The node then completes its configuration using this data (block 320).

If the booting node is determined by the SMM to be a boot node (query block 322), then that node loads additional information into its local memory and its slave scalability chipset to allow it to act as a boot node (host node) for other secondary nodes in the partition (block 326), and the boot process is completed in that node (block 328). Thus, the boot node takes over the partition and completes the rest of the POST for the entire partition, now viewed as one logical system.

If the node is NOT to be configured as a boot node (i.e., is to be configured as a hot spare or secondary node), then that node "sleeps" its processors (which will be controlled by the boot node). This node's independent boot process is thus complete (block 324), and that node will be told which node will be the boot node for the partition.

All of part of the boot process described in FIG. 3 can be performed autonomously by the SMM, or the remote manager connected to the SMM's service processor can remotely control the SMM. The connection between the remote manager and the SMM is preferably via a network connection with the SMM (e.g., via a network interface card), or alternatively the remote manager communicates directly with the SMM, preferably via a serial connection.

The present invention thus allows dynamic configuration of a partition, such that nodes can be swapped in and out during and after initial configuration under the control of the SMM. Since the SMM itself is capable of being remotely controlled, then a remote manager can perform this dynamic configuration and re-configuration, making any node the boot node, etc. Furthermore, the remote manager can communicate with the SMM to power up each node, configure the nodes into a partition, including a hot spare node, and reallocate configuration data to different nodes. Thus if one node should be pulled out of the partition, the SMM uses data stored in the SMM to dynamically reconfigure a replacement node to assume the same characteristics of the pulled node.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A system capable of dynamically configuring a multi-node computer, the system comprising:
   a plurality of processor nodes; and
   a scalability management module directly coupled to each of the plurality of processor nodes, the scalability management module including:
      a dedicated processor for managing the plurality of nodes, the dedicated processor not being from the plurality of processor nodes; and
      a scalability chipset for enabling the dedicated processor to dynamically configures the plurality of nodes into a coordinated multi-node computer, wherein the scalability chipset comprises a local memory controller for a booting node in the plurality of processor nodes, instructions for processor allocation and set-up of hardware/software in the booting node, and host bridge controller information forte booting node,
   wherein the multi-node computer is configured by the scalability management module without a re-wiring of connections between processor nodes during a subsequent reconfiguration of the multi-node computer.

2. The system of claim 1, wherein the scalability chipset in the scalability management module is capable of selectively configuring each processor node, in the coordinated multi-node computer, as a host node, a secondary node, or a hot snare node.

3. The system of claim 1, wherein the plurality of processor nodes includes a hot spare node capable of being configured by the scalability management module if another of the processor nodes fails or is removed from the multi-node computer.

4. The system of claim 1, further comprising:
   a remote manager logic coupled to the scalability management module, wherein the remote manager logic controls the configuration of the multi-node computer via the scalability management module.

5. A method for dynamically configuring a multi-node computer, the method comprising:
   performing a primary boot on a plurality of processor nodes;
   registering configuration parameters from each of the processor nodes with a scalability management module, the scalability management module including:
      a dedicated processor for managing the plurality of nodes, the dedicated processor not being from the plurality of processor nodes; and
      a scalability chipset for enabling the dedicated processor to dynamically configures the plurality of nodes into a coordinated multi-node computer, wherein the scalability chipset comprises a local memory controller for a booting node in the plurality of processor nodes, instructions for processor allocation and set-up of hardware/software in the booting node, and host bridge controller information for the booting node;
   configuring each processor node according to configuration data supplied by the scalability management module; and
   completing a full boot on a host processor node, the host processor node being selected by the scalability management module from the plurality of processor nodes, to enable the host processor node to control the multi-node computer.

6. The method of claim 5, wherein the scalability chipset in the scalability management module is capable of selectively configuring each processor node, in the coordinated multi-node computer, as a host node, a secondary node, or a hot spare node.

7. The method of claim 5, wherein the plurality of processor nodes includes a hot spare node capable of being configured by the scalability management module if another of the processor nodes fails or is removed from the multi-node computer.

8. The method of claim 5, further comprising:
   coupling a remote manager logic to the scalability management module, wherein the remote manager logic controls the configuration of the multi-node computer via the scalability management module.

9. A computer program product, residing on a computer-readable storage media, for dynamically configuring a multi-node computer, the computer program product comprising:
   program code for performing a primary boot on a plurality of processor nodes;
   program code for registering configuration parameters from each of the processor nodes with a scalability management module, the scalability management module including:
      a dedicated processor for managing the plurality of nodes, the dedicated processor not being from the plurality of processor nodes; and
      a scalability chipset for enabling the dedicated processor to dynamically configures the plurality of processor nodes into a coordinated multi-node computer, wherein the scalability chipset comprises a local memory controller for a booting node in the plurality of processor nodes, instructions for processor allocation and set-up of hardware/software in the booting node, and host bridge controller information for the booting node;
   program code for configuring each processor node according to configuration data supplied by the scalability management module; and
   program code for completing a full boot on a host processor node, the host processor node being selected by the scalability management module from the plurality of processor nodes, to enable the host processor node to control the multi-node computer.

10. The computer program product of claim 9, wherein the scalability chipset in the scalability management module is capable of selectively configuring each processor node, in the coordinated multi-node computer, as a host node, a secondary node, or a hot spare node.

11. The computer program product of claim 9, wherein the plurality of processor nodes includes a hot spare node capable of being configured by the scalability management module if another of the processor nodes fails or is removed from the multi-node computer.

12. The computer program product of claim 9, further comprising:
   program code for coupling a remote manager logic to the scalability management module, wherein the remote manager logic controls the configuration of the multi-node computer via the scalability management module.

13. The system of claim 3, wherein the hot spare node does not include a mass storage device.

14. The method of claim 7, wherein the hot spare node does not include a mass storage device.

15. The computer program product of claim 11, wherein the hot spare node does not include a mass storage device.

16. A method for dynamically configuring a multi-node computer, the method comprising:

performing a primary boot of a booting node in a multi-node computer, the primary boot including a first part of a Power On Self-Test (POST) and a memory configuration of the booting node;

in response to the primary boot being completed for the booting node, determining if the booting node is to be configured as a standalone node that is not a component of the multi-node computer;

in response to determining that the booting node is to be configured as a standalone node, configuring the booting node as a standalone node tat is not a component of the multi-node computer, in response to determining that the booting node is not to be configured as a standalone node, determining if a Scalability Management Module (SMM) is available to the booting node, wherein the SMM includes a master scalability chip set the includes memory controllers and processor allocation logic for the booting node;

in response to determining that the SMM is available to the booting node, registering unique configuration information km the booting node with the SMM, wherein the unique configuration information about the booting node that includes a Universal Unique Identifier (UUID for the booting node, a quantity and type of processors for the booting node, an amount of local memory in the booting node, identifiers for Input/Output (I/O) devices in the booting nod; and an identifier of a backboard to which the booting node is coupled;

in response to determining that the booting node is to be part of the multi-processor computer system, waiting for a "green light" from the SMM indicating that the SMM has determined configuration information needed to boot the booting node;

in response to receiving a "green light" from the SMM, querying, by the booting node, the SMM to determine if the booting node will be booted as a host, secondary or hot spare node, and then booting the node as a host, secondary or hot spare node according to a determination by and an instruction from the SMM to the booting node;

in response to the booting node receiving an instruction to boot at a host node, booting the booting node as a host node and taking over control, by the host node, of any secondary nodes in the multi-processor computer system; and in response to determining that the booting node is not to be configured as a host node, putting the processors in the booting node to sleep in order to allow a host node in the multi-processor system to control the booting node as a secondary or hot spare node.

* * * * *